July 14, 1959   C. W. FROEHLICH   2,894,516
HYDRAULIC DUMPING APPARATUS
Filed April 9, 1957   2 Sheets-Sheet 1

INVENTOR.
CHARLES W. FROEHLICH
BY
Mellin and Hanscom
ATTORNEYS

July 14, 1959 — C. W. FROEHLICH — 2,894,516
HYDRAULIC DUMPING APPARATUS
Filed April 9, 1957 — 2 Sheets-Sheet 2
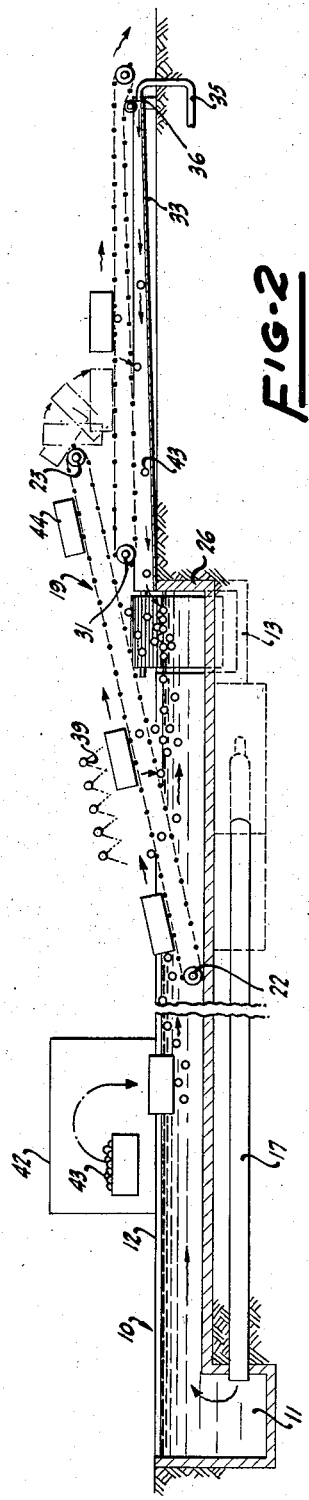
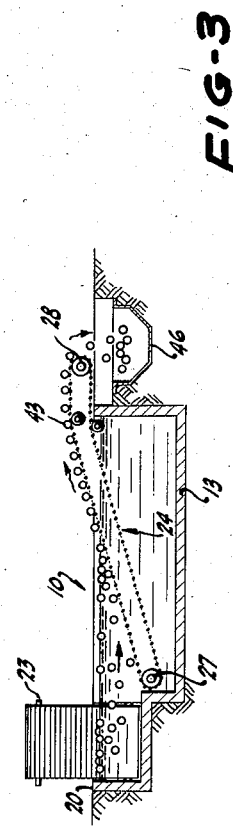
INVENTOR.
CHARLES W. FROEHLICH
BY
Meelin and Hanscom
ATTORNEYS

United States Patent Office 2,894,516
Patented July 14, 1959

2,894,516

HYDRAULIC DUMPING APPARATUS

Charles W. Froehlich, Fullerton, Calif., assignor to Hunt Foods, Inc., Los Angeles, Calif., a corporation of Delaware Application April 9, 1957, Serial No. 651,652

5 Claims. (Cl. 134—62)

This invention relates to a device for separating articles from containers, and, more specifically, to a device for emptying produce from lug boxes.

In the food processing industry, it is customary to truck the produce from farms to the food processing plant in open topped lug boxes, the boxes being stacked in layers on pallets. When the truck arrives at the plant, fork-lift trucks pick up the pallets with the boxes stacked thereon and carry them to the intended point of use. The pallets are then unloaded manually by a workman, who takes each box separately and dumps the produce contained therein onto a conveyor belt or into a hopper, and then stacks the empty box on another pallet. After the pallet holding the stacked empty boxes is full, it is taken away to another location, where the boxes are again manually unstacked and run through a box washing machine and are again manually stacked on pallets. As is evident, such an operation requires much expensive and time-consuming handling of the boxes by different operators.

The applicant has devised an apparatus which eliminates most of this undesired handling of the boxes by enabling the fork-lift operator, who removes the pallet loads from the trucks entering the plant, to dump the entire pallet load into a hydraulic separator. The separator then separates automatically the produce from the boxes and delivers the produce to the intended point of use, and at the same time delivers the empty boxes through a box washer to an operator, who then stacks the washed empty boxes on a pallet. The only manual operation is in the last step of stacking the washed empty boxes.

It is a primary object of this invention to provide a fluid-filled device into which article filled containers may be dumped, with means to separate the articles from the container and to deliver the articles to one point and the container to another point.

A further object of the invention is to provide a means for separating produce from produce filled boxes including an elongated fluid-filled tank into which the filled boxes may be dumped, means to circulate the fluid lengthwise in the tank to move the produce and boxes into engagement with a first conveyor, which removes only the boxes while allowing the produce to pass therethrough, the passed produce then coming into engagement with the second conveyor, which removes the produce from the tank.

A further object is to provide an elongated fluid-filled tank with means to cause a fluid flow therethrough, a first conveyor extending into the tank intermediate its ends to remove boxes therefrom, a second conveyor extending into the tank between the first conveyor and the outlet of the tank to remove the produce therefrom, and a third conveyor having its upper flight disposed below the discharge end of the first conveyor, whereby boxes issuing from the first conveyor will turn through a half revolution onto the third conveyor to insure the emptying of the boxes.

A further object of the invention is to provide a device as set out in the previous objects, with means to wash the boxes as they are removed from the tank, and with means under the third conveyor to wash any produce falling therethrough back into the tank.

Other objects and advantages will become apparent in the course of the following detailed description.

In the drawings, forming a part of this specification, and in which like parts are designated by like reference numerals.

Fig. 2 is a front elevational sectional view taken along the line 2—2 of Fig. 1.

Fig. 3 is a cross-sectional view taken along the line 3—3 of Fig. 1.

Figure 1:
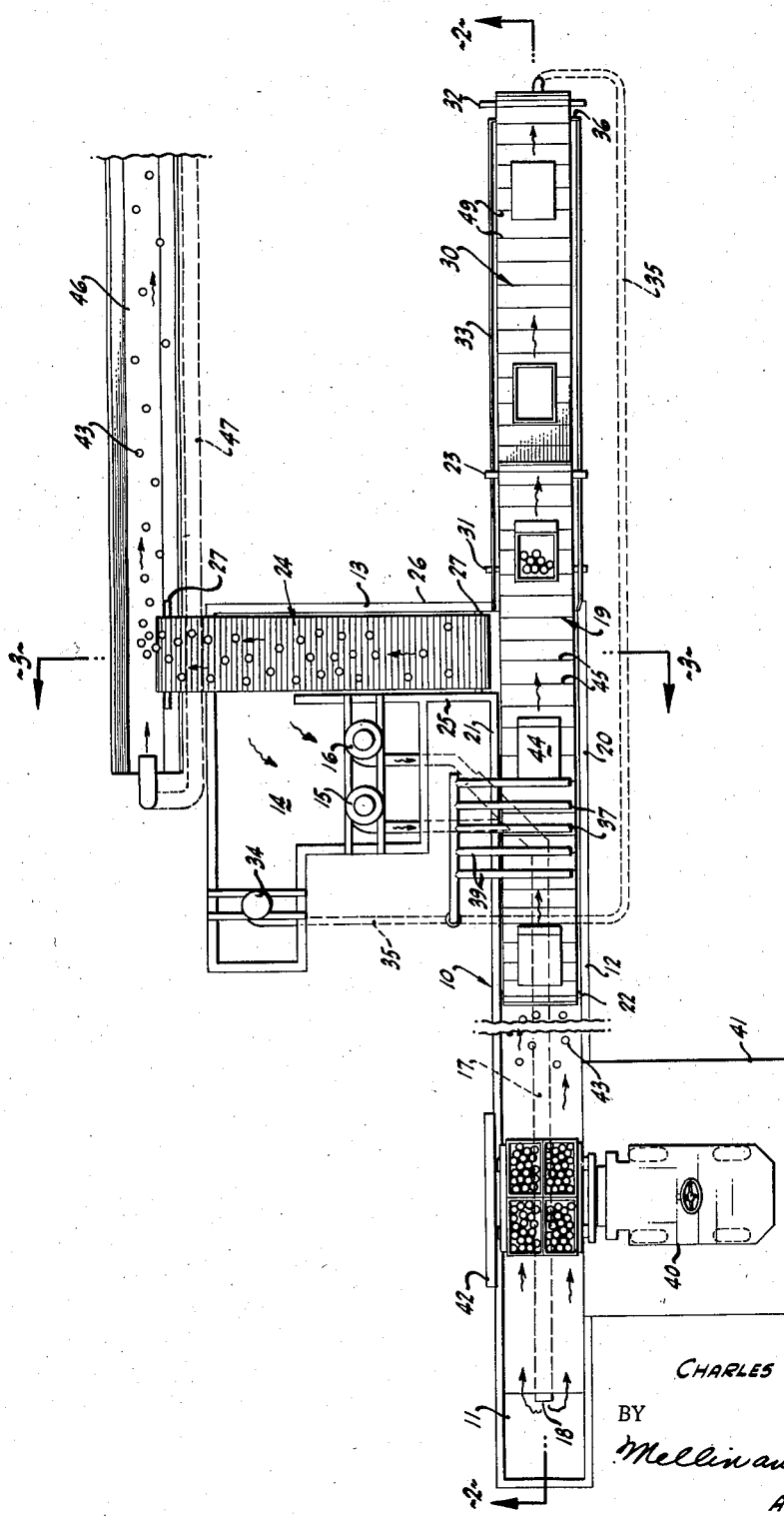
Fig. 1 is a plan view of an embodiment of the invention.

In the drawings, wherein for purposes of illustration is shown a preferred embodiment of the invention, the reference numeral 10 is used to generally indicate an elongated open-topped tank having a fluid inlet end 11, a tank portion 12 extending forwardly therefrom and connecting with a tank portion 13 extending rearwardly to the sump or fluid outlet end 14. A pair of fluid pumps 15 and 16 is adapted to pump fluid contained within the tank 10 from the sump 14 through conduit 17, which extends at 18 into the inlet end 11 of the tank, whereby a continuous fluid flow through the tank from the inlet end 11 to the outlet end 14 may be maintained. Suitable power means (not shown) may be utilized to operate the pumps 15 and 16, and, if desired, a single pump may be utilized in place of the pair of pumps shown herein.

A first endless conveyor 19 extends into the tank portion 12, with the side edges of the conveyor being in close adjacency with the side walls 20 and 21 of the tank. The conveyor 19 is trained around idler sprocket 22 at the bottom of the tank and is driven at the upper end of the conveyor by drive sprocket 23 powered by conventional means (not shown) so as to move the upper flight of the conveyor in an upwardly slanting direction.

A second endless conveyor 24 extends into the tank portion 13, with the side edges of this conveyor in close adjacency with the side walls 25 and 26 of the tank, and with the conveyor 24 being trained around idler sprocket 27 at the bottom of the tank and driven by drive sprocket 28 powered by suitable means (not shown) so as to drive the upper flight of the conveyor 24 in an upwardly slanting direction.

A third endless conveyor 30 is provided, with the upper flight thereof disposed in alignment with and below the upper or discharge end of conveyor 19, and is trained around idler sprocket 31 and driven by drive sprocket 32 powered by suitable means (not shown) so as to drive the upper flight of the conveyor 30 in a direction away from the tank 10.

A generally U-shaped trough 33 is situated below conveyor 30, with one end of the trough opening into the tank 10. A third pump 34 is provided to pump the fluid from sump 14 through conduit 35 to the inlet end 36 of trough 33, to maintain a fluid flow in trough 33 from the inlet end thereof to the tank 10.

Situated above the conveyor 19 is a box washer comprising a plurality of spaced parallel pipes 37 in fluid communication with a common header 38 connected to conduit 35, each pipe 37 being provided with a plurality of jet orifices or nozzles 39 directed toward the conveyor 19, whereby when the pump 34 is in operation, a plurality of sprays will be directed downwardly upon the conveyor 19 to provide a washing action on the boxes passing upwardly thereon.

Again, if desired, a single pump may be used to pump fluid through conduit 35 as well as conduit 17.

In operation, the tank 10 is filled with a fluid, preferably water, and the pumps 15, 16 and 34 are started to circulate water through the tank 10, trough 33, and box washer pipes 37. A conventional fork-lift truck 40 is driven onto a dumping platform 41 situated at one side of the tank 10 near the inlet end thereof, with the forks of the truck 40 being brought into positioning engagement with a wall member 42 extending upwardly from the opposite side of the tank 10. The pallet load of boxed fruit is dumped lengthwise into the tank by a rotative movement of the forks, so that the boxes stacked on the pallet slide or fall into the tank. In so falling, most, if not all, of the fruit 43 will be thrown clear of the boxes 44, so that the fruit and boxes will be initially separated.

The fluid flow through the tank will cause the fruit and boxes to float into contact with the first conveyor 19, and the boxes 44 will be carried thereby up out of the tank. The conveyor 19 has relatively widely spaced rungs 45 to enable the fruit 43 to pass freely therebetween while yet being sufficiently close together to remove the boxes from the tank.

The fruit 43 will be carried by the fluid flow in the tank into engagement with the continuously driven conveyor 24, which has a sufficiently fine mesh to prevent the fruit from passing therethrough so that the fruit will be carried up along the upper flight thereof and will be dumped into a flume 46, where it is washed away to a point of use by means of a fluid entering the flume 46 through conduit 47.

As the boxes 44 are carried up the inclined conveyor 19, they are washed by the spray issuing from the box washer pipes 37. In addition, if, as is usual, the boxes are inverted, the fruit which may have been trapped therewithin will fall by gravity into the tank 10, so as to completely empty the boxes.

Occasionally, boxes may be carried out of the tank by the conveyor 19 while in a right-side up position, with some of the fruit remaining therein. This fruit is removed automatically in the following manner. As all of the boxes reach the top of conveyor 19 and are urged upwardly therepast, they will pivot around the conveyor end and will turn through 180°, landing on the third conveyor 30 in a reverse position. Thus, the right-side up boxes traveling up conveyor 19 will be inverted when they land on the upper flight of conveyor 30, and any fruit remaining in the boxes will be jarred therefrom to fall by gravity between the relatively widely spaced rungs 49 of conveyor 30 into the trough 33, from which they are washed back into tank 10 by the water flowing through the trough 33.

By this operation, all of the boxes 44 arrive washed and completely unloaded at the discharge end of conveyor 30, and are carried away or stacked by hand by an operator on pallets, and all of the fruit 43 is delivered to the flume 46, where it is directed to a desired point of use.

The openings in the conveyors 19, 24 and 30 must be of such a size that conveyors 19 and 30 will allow the fruit to pass therethrough while preventing the boxes from passing therethrough, and so that conveyor 24 will allow the water to pass through while preventing the fruit from passing therethrough.

It will be noted that the separation achieved by this invention is not dependent upon the relative densities of the boxes and of the fruit contained therein. That is, the separation will take place whether the fruit floats on the surface of the water, as do the boxes, or whether the fruit tends to fall to the bottom of the tank. Also, it does not matter whether the boxes contain produce, such as fruits and vegetables, or any other article, so long as the fluid flow through the tank is sufficient to carry the articles into final engagement with the second conveyor. Similarly, the density of the boxes is not a determining factor of this invention. That is, the separation will take place whether the boxes float on the surface of the water or tend to sink therein.

If desired, the tank 10 could be in a straight line, rather than roughly U-shaped as shown, as long as box conveyor 19 is upstream from the fruit conveyor 24.

It is to be understood that the form of the invention, herewith shown and described, is to be taken as a preferred embodiment of the same, and that various changes in the shape, size and arrangement of parts may be resorted to without departing from the spirit of my invention, or the scope of the attached claims.

Having thus described my invention, what I claim and desire to secure by Letters Patent is:

1. A device of the character described comprising an open top elongated tank adapted to be filled with a fluid and having a fluid inlet at one end thereof and a fluid outlet at the other end thereof, said tank being adapted to have containers with articles contained therein dumped into said tank adjacent the inlet end thereof, means to cause fluid flow through said tank from said inlet end to said outlet end, a first endless conveyor means extending into said tank below the level of fluid when filled and intermediate the ends thereof to remove the containers therefrom, said first conveyor means having openings therethrough of greater size than said articles, and a second endless conveyor means extending into said tank intermediate said first conveyor means and said outlet to remove said articles from said tank, said second conveyor means having openings of smaller size than said articles.

2. A device of the character described comprising an open top elongated tank adapted to be filled with a fluid and having a fluid inlet at one end thereof and a fluid outlet at the other end thereof, said tank being adapted to have containers with articles contained therein dumped into said tank adjacent the inlet end thereof, means to circulate fluid from said outlet to said inlet to cause fluid flow in said tank from said inlet to said outlet, a first endless conveyor means extending into said tank below the level of fluid when filled and intermediate the ends thereof to remove the containers therefrom, said first conveyor means having openings therethrough of greater size than said articles, and a second endless conveyor means extending into said tank intermediate said first conveyor means and said outlet to remove said articles from said tank, said second conveyor means having opening of smaller size than said articles.

3. A device of the character described comprising an open top elongated tank adapted to be filled with a fluid and having a fluid inlet at one end thereof and a fluid outlet at the other end thereof, said tank being adapted to have containers with articles contained therein dumped into said tank adjacent the inlet end thereof, means to cause fluid flow through said tank from said inlet end to said outlet end, a first endless conveyor means extending into said tank intermediate the ends thereof to remove the containers therefrom, said first conveyor means having openings therethrough of greater size than said articles, a second endless conveyor means extending into said tank intermediate said first conveyor means and said outlet to remove said articles from said tank, said second conveyor means having openings of smaller size than said articles, a third endless conveyor means having the upper flight thereof disposed beneath the discharge end of said first conveyor to receive the containers discharged therefrom and having openings therethrough of greater size than said articles, a trough disposed beneath said third conveyor and having one end in fluid communication with said tank, and means to cause fluid flow through said trough from the other end thereof to said tank.

4. A device of the character described comprising an open top elongated tank adapted to be filled with a fluid and having a fluid inlet at one end thereof and a fluid outlet at the other end thereof, said tank being adapted to have containers with articles contained therein dumped into said tank adjacent the inlet end thereof, means to cause fluid flow through said tank from said inlet end to said outlet end, a first endless conveyor means extending into said tank intermediate the ends thereof to remove the containers therefrom, said first conveyor means having openings therethrough of greater size than said articles, a second endless conveyor means extending into said tank intermediate said first conveyor means and said outlet to remove said articles from said tank, said second conveyor means having openings of smaller size than said articles, a third conveyor means having the upper flight thereof disposed beneath the discharge end of said first conveyor to receive the containers discharged therefrom and having openings therethrough of greater size than said articles, a trough disposed beneath said third conveyor and having one end in fluid communication with said tank, and means to circulate fluid from said tank to the other end of said trough to cause fluid flow through said trough back to said tank.

5. A device of the character described comprising an open top elongated tank adapted to be filled with a fluid and having a fluid inlet at one end thereof and a fluid outlet at the other end thereof, said tank being adapted to have containers with articles contained therein dumped into said tank adjacent the inlet end thereof, means to cause fluid flow through said tank from said inlet end to said outlet end, a first endless conveyor means extending into said tank intermediate the ends thereof to remove the containers therefrom, said first conveyor means having openings therethrough of greater size than said articles, a second endless conveyor means extending into said tank intermediate said first conveyor means and said outlet to remove said articles from said tank, said second conveyor means having openings of smaller size than said articles, a third conveyor means having the upper flight thereof disposed beneath the discharge end of said first conveyor to receive the containers discharged therefrom, said third conveyor having openings therethrough of greater size than said articles, a trough disposed beneath said third conveyor and having one end in fluid communication with said tank, a plurality of nozzles disposed above and directed towards said first conveyor means, and means to circulate fluid from said tank to the other end of said trough to cause fluid flow through said trough back to said tank, said last named means also causing fluid flow from said tank to said nozzles.

References Cited in the file of this patent

UNITED STATES PATENTS

| | | |
|---|---|---|
| 1,186,677 | Parker | June 13, 1916 |
| 1,454,051 | Heulings | May 8, 1923 |
| 2,179,868 | Stebler | Nov. 14, 1939 |
| 2,273,939 | Dammers | Feb. 24, 1942 |
| 2,540,766 | Stilwell | Feb. 6, 1951 |
| 2,741,379 | Stryker | Apr. 10, 1956 |